(No Model.)
W. H. HANSELL.
CAR BRAKE.
No. 505,763. Patented Sept. 26. 1893.
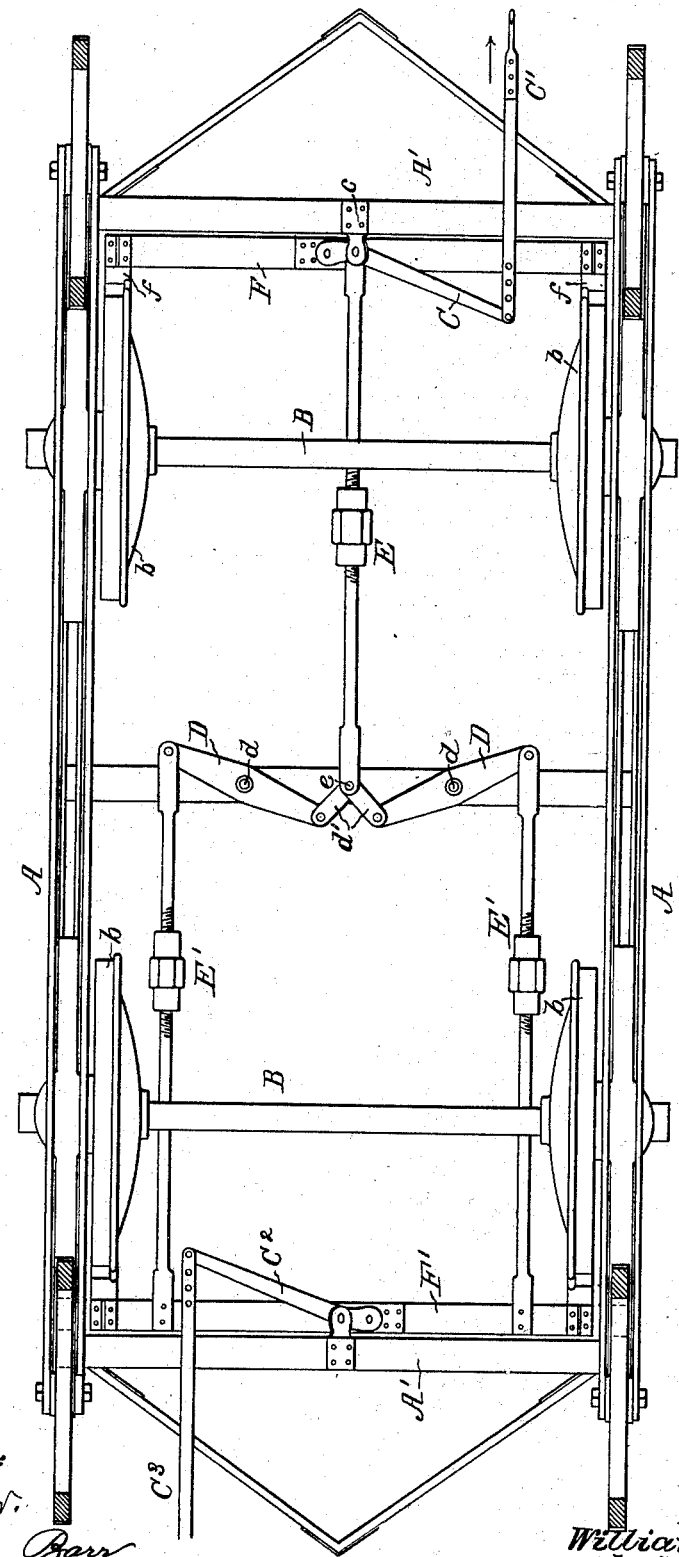
Witnesses:
R. Schleich
William S. Barr
Inventor:
William H. Hansell
by his Attorneys
Howson & Howson

UNITED STATES PATENT OFFICE.

WILLIAM H. HANSELL, OF PHILADELPHIA, PENNSYLVANIA.

CAR-BRAKE.

SPECIFICATION forming part of Letters Patent No. 505,763, dated September 26, 1893.

Application filed June 24, 1893. Serial No. 478,689. (No model.)

*To all whom it may concern:*

Be it known that I, WILLIAM H. HANSELL, a citizen of the United States, residing in Philadelphia, Pennsylvania, have invented certain Improvements in Car-Brakes, of which the following is a specification.

The object of my invention is to construct a simple and effective brake for the wheels of cars that can be operated from either end of the car.

My invention is especially applicable for use in connection with the trucks of motor or cable cars.

The figure in the accompanying drawing is a plan view of a car truck illustrating my improved brake.

A A are the side beams of the truck.

B B are the axles upon which are secured the wheels $b$. The axles are mounted in suitable bearings adapted to the truck frame.

A′ are the cross bars tying the side beams of the truck together.

Upon the center bar are two levers D D pivoted at $d$ to the said bar. Secured to the inner arm of each lever are links $d'$, both attached to a brake rod E at $e$. This brake rod in turn is attached to the brake beam F, provided with suitable brake shoes $f$.

Pivoted to a bearing $c$ on the cross bar A′, adjacent to the brake beam F, is a lever C, pivoted to the brake frame and connected to the draw rod C′, to which is attached the brake chain, so that on moving this rod in the direction of the arrow, the brakes will be applied to the forward wheels, and as the outer arms of the levers D are attached to the rear brake beam F′ by rods E′, the brakes will be applied also, to the rear wheels, and in order to operate the brake mechanism from the rear, I provide a lever C² pivoted to a cross beam A′ and connected to the brake beam F′. The long arm of this lever is connected to a draw rod C³ to which the rear chain is attached, thus, by drawing on either rod, the brakes will be applied, and on releasing the rods, the brakes will be free. By this arrangement a very simple contrivance which can be readily applied to a car truck, can be made, which will not get out of order, and which can be readily adjusted, as each of the brake rods E, E′ is provided with adjusting nuts for taking up or letting out the slack, so as to regulate the pressure of the brakes upon the wheels.

I claim as my invention—

1. The combination in the frame of the truck, of the two pivoted levers D D, a central brake rod to which the inner ends of the said levers are connected, side brake rods to which the outer ends of the levers are connected, a front brake beam to which the central brake rod is connected, and the rear brake beam to which the side rods are connected, brake controlling mechanism attached to one of said brake beams, substantially as described.

2. The combination of the truck frame, the pivoted levers D, a central brake rod to which the inner ends of the levers are connected, side brake rods to which the outer ends of the levers are connected, a front brake beam to which the central rod is attached, and a rear brake beam to which the side brake rods are attached, a lever pivoted to the truck frame and attached to one of said brake beams, and a draw rod attached to the braking mechanism of the car, substantially as specified.

3. The combination of the side frame of a truck, the cross bars connecting the side frames together, the axles and wheels, with front and rear brake beams, shoes thereon, levers D D pivoted to the central cross bar, links on the inner end of each lever, a central brake rod to which said links are connected, said brake rod being attached to the front brake beam, side brake bars attached to the rear brake beam and attached to the outer ends of the levers D, a pivoted brake operating lever pivoted at each end of the truck frame and connected to their respective brake beams, and operating mechanism at each end of the car for actuating the brake, substantially as described.

In testimony whereof I have signed my name to this specification in the presence of two subscribing witnesses.

WILLIAM H. HANSELL.

Witnesses:
H. F. REARDON,
WILLIAM A. BARR.